Patented Oct. 9, 1951

2,571,029

UNITED STATES PATENT OFFICE 2,571,029

ORGANOSILICON RESINS

John T. Goodwin, Midland, Mich., assignor to Dow Corning Corporation, Midland, Mich., a corporation of Michigan No Drawing. Application August 21, 1950, Serial No. 180,710

1 Claim. (Cl. 260—45.2)

This invention relates to copolymers of phenylmethylsiloxanes, glycerine, phthalic anhydride, and butylated melamine formaldehyde resin.

Since the beginning of commercial use of polysiloxane resins, attempts have been made to improve the thermosetting characteristics of these materials. Whereas polysiloxane resins such as, for example, phenylmethyl resins are extremely thermostable in that they do not decompose at elevated temperatures, nevertheless these materials tend to soften when heated at temperatures of above 150° C. This softening is disadvantageous in that temperatures of 150° C. and above are the temperatures at which siloxanes are generally employed. As a result of such softening, siloxane resins are undesirable for many coating and electrical uses in spite of the great thermostability and good electrical properties.

Many attempts have been made to eliminate this effect, such as by incorporating organic materials into siloxane resins. One such method is disclosed in the copending application of Melvin J. Hunter et al., Serial No. 59,414, filed November 10, 1948. Here is shown that improved thermosetting properties are obtained by reacting phenylmethyl alkoxy silanes with glycerine and phthalic anhydride. The resulting materials are a great improvement over conventional siloxanes so far as rate of cure and lack of softening at high temperatures is concerned.

The applicant has found that novel and unexpected improvements in such resins is effected by incorporating therein butylated melamine formaldehyde resin.

It is the object of this invention to improve the drying time, flex life, and craze life of heretofore employed organosiloxane compositions. Another object is to eliminate the hot tack of siloxane resins. Another object is to provide a superior siloxane coating composition for electrical conductors.

This invention relates to a resinous composition composed of:

(1) An organo silicon resin having the composition 65 to 80 per cent by weight of a siloxane having the composition 65 to 75 mol per cent phenylmethylsiloxane and 25 to 35 mol per cent monophenylsiloxane, from 10 to 17.5 mol per cent glycerine, and from 10 to 17.5 mol per cent phthalic anhydride, and (2) Butylated melamine formaldehyde resin in amount such that the overall composition is from 85 to 97.5 per cent of (1) and from 2.5 to 15 per cent of (2).

The siloxanes employed to make the compositions of this invention are partially hydrolyzed alkoxy siloxanes. One method for preparing these materials is by adding less than the theoretical amount of water to a mixture of phenylmethyldialkoxysilanes and phenyltrialkoxysilanes. Under such conditions some of the alkoxy groups will be hydrolyzed and the resulting silanol will give siloxane linkages. Any alkoxy silanes may be employed, although preferably the alkoxy radical should be one containing less than six carbon atoms.

These alkoxylated polysiloxanes are then reacted with glycerine during which reaction the remaining alkoxy groups are removed as alcohol. The resulting polysiloxane glyceride is then reacted with phthalic anhydride to produce a resinous material.

The resins may then be dissolved in solvents such as xylene, toluene, ketones, and ethers. The solution of the siloxane-glycerine-phthalic anhydride resin is then mixed with a solution of butylated melamine formaldehyde resin, and upon evaporation of the solvent the compositions of this invention are obtained. If desired, the mixed solutions may be refluxed for 2 to 3 hours before removal of the solvent. No particular advantage, however, has been found in this heat treatment. In general, therefore, it is sufficient to simply mix the solution of the two resins, apply the solution to an electrical conductor, and then heat at a temperature of above 135° C. to obtain a firmly adhering uniform coat.

The butylated melamine formaldehyde resin employed herein is the standard commercial product and is employed in an unmodified form. Usually the resin is best used in a solvent composed of a mixture of butanol and xylene. When the melamine resin is employed in amount less than 2.5 per cent there is no significant improvement in the siloxane composition. If more than 15 per cent melamine resin is employed, an inferior coating composition is obtained.

The composition of this invention possesses properties which are of an entirely different order of magnitude from any other siloxane composition heretofore known. Specifically, the flex life, craze life, and setting time at from 200° C. to 250° C. of the instant compositions is greatly superior to those of any other heretofore known siloxane compositions. Consequently, the present materials are greatly superior for use as high temperature electrical varnishes to siloxane compositions previously employed for such purposes. They substantially reduce the time and cost of fabricating electrical equipment which is insulated with siloxane varnishes and they greatly improve the life of such equipment.

The following examples are illustrative only and should not be construed as limiting the invention thereto.

*Example 1.*—The composition (1) employed in the following examples was prepared as follows: 200 parts by weight of a partially hydrolyzed isopropoxy polysiloxane having the composition 70 mol per cent phenylmethylsiloxane and 30 mol per cent monophenylsiloxane, said siloxane containing 23.5 per cent by weight silicon bonded isopropoxy groups, was mixed with 36.6 parts by weight USP glycerine, and the mixture was heated slowly up to 190° C. until 17.5 parts of isopropyl alcohol had been removed. The mixture was cooled to 80° C. and 35.4 parts of phthalic anhydride was added. The mixture was agitated and heated to 190° C. and held at that temperature until the mixture became quite viscous. The resin was cooled and then dissolved in xylene. This xylene solution was employed in the following runs.

The above composition in xylene solution was mixed with a solution of butylated melamine formaldehyde resin designated as "Uformite" 55 produced by Rohm and Haas Company. The solutions were mixed in varying amounts such that the relative proportion of (1) and of the melamine resin was 90 per cent by weight and 10 per cent by weight, 95 per cent by weight and 5 per cent by weight, 92.5 per cent by weight and 7.5 per cent by weight, respectively. The resins formed a clear solution in each case, and this solution was used to coat metal panels, and the resulting films were then cured and tested as shown below. For comparison, a blank employing composition (1) was also tested.

In the table the dashes for hot tack signify that the resin became tack-free at the indicated temperature in a time too short to measure.

*Example 2.*—The xylene solution of (1) was mixed with a solution of the butylated melamine resin of Example 1. The two solutions were mixed in amount such that the composition of the resulting resin mixture was 90 per cent by weight of (1) and 10 per cent by weight melamine resin, based on the solvent-free material.

The mixed solutions were refluxed for 2½ hours and metal panels were then dipped in the solution and the resulting resin was found to have the folowing properties: the flex life at 250° C. was >111 hours; the craze life at 250° C. was >111 hours; the hot tack time at 150° C. was 2 hours and at 200° C. and 250° C. it was instantaneous.

That which is claimed is:

A composition of matter comprising a mixture of from 2.5 to 15 per cent by weight of butylated melamine formaldehyde resin and from 85 to 97.5 per cent by weight of a resin composed of (1) 65 to 80 per cent by weight of a resinous material having the composition 65 to 75 molar per cent phenylmethylsiloxane and 25 to 35 molar per cent monophenylsiloxane, (2) 10 to 17.5 per cent by weight glycerine, and (3) from 10 to 17.5 per cent by weight phthalic anhydride.

JOHN T. GOODWIN.

REFERENCES CITED

The following references are of record in the file of this patent:

UNITED STATES PATENTS

| Number | Name | Date |
|---|---|---|
| 2,500,843 | MacKenzie et al. | Mar. 14, 1950 |

| Composition of Solvent free Resin | (1) | 90% (1) 10% melamine resins | 95% (1) 5% melamine resins | 92.5% (1) 7.5% melamine resins |
|---|---|---|---|---|
| | Hours | | | |
| Flex life at 250° C | 49 | >300 | >250 | >111 |
| Craze life at 250° C | 100 | >672 | >276 | >111 |
| Hot tack: | | | | |
| 150° C | 4 | ¼ | 4 | 3 |
| 200° C | 3 | | ½ | |
| 250° C | 1 | | | |